United States Patent [19]
Winkler

[11] 3,903,815
[45] Sept. 9, 1975

[54] FERTILIZER APPLICATOR TOOL

[76] Inventor: Robert D. Winkler, 2877 Campfire Lane, Orlando, Fla. 32807

[22] Filed: Sept. 28, 1973

[21] Appl. No.: 401,582

[52] U.S. Cl. .................... 111/1; 111/92; 47/48.5
[51] Int. Cl. .............................................. A01c 5/02
[58] Field of Search .............. 111/92, 96, 98, 99, 1, 111/4, 7.1; 47/1, 48.5; 172/21, 22

[56] References Cited
UNITED STATES PATENTS

| | | | |
|---|---|---|---|
| 554,139 | 2/1896 | Ober | 111/4 X |
| 1,783,026 | 11/1930 | Ober | 111/4 X |
| 2,030,770 | 2/1936 | Smith | 172/22 UX |
| 2,380,721 | 7/1945 | Brigden | 111/99 X |
| 3,290,821 | 12/1966 | Parry | 111/99 X |

*Primary Examiner*—Stephen C. Pellegrino

[57] ABSTRACT

A fertilizer applicator tool intended for use with solid bullet shaped pellets of fertilizer in a manner to inject the same into the ground and consisting of an elongated hollow tubular member open at the bottom end and having a flat ground engaging plate disposed thereabout adapted to support the tubular member on top of the ground, and a longitudinally extended axially slidable rod disposed in the tubular member and slidable toward and away from the open end thereof with a foot operated pedal attached to the rod and projecting from the tubular member for manual operation of the rod, and a slot in the side wall of the tubular member disposed above the ground engaging plate and beneath the bottom end of the rod for inserting into the tubular member chamber a bullet shaped compressed pellet of fertilizer with operation of the rod in a downward direction engaging the top of the pellet and driving the same downwardly into the ground at a position in close proximity to the roots of a tree, bush and the like.

6 Claims, 4 Drawing Figures

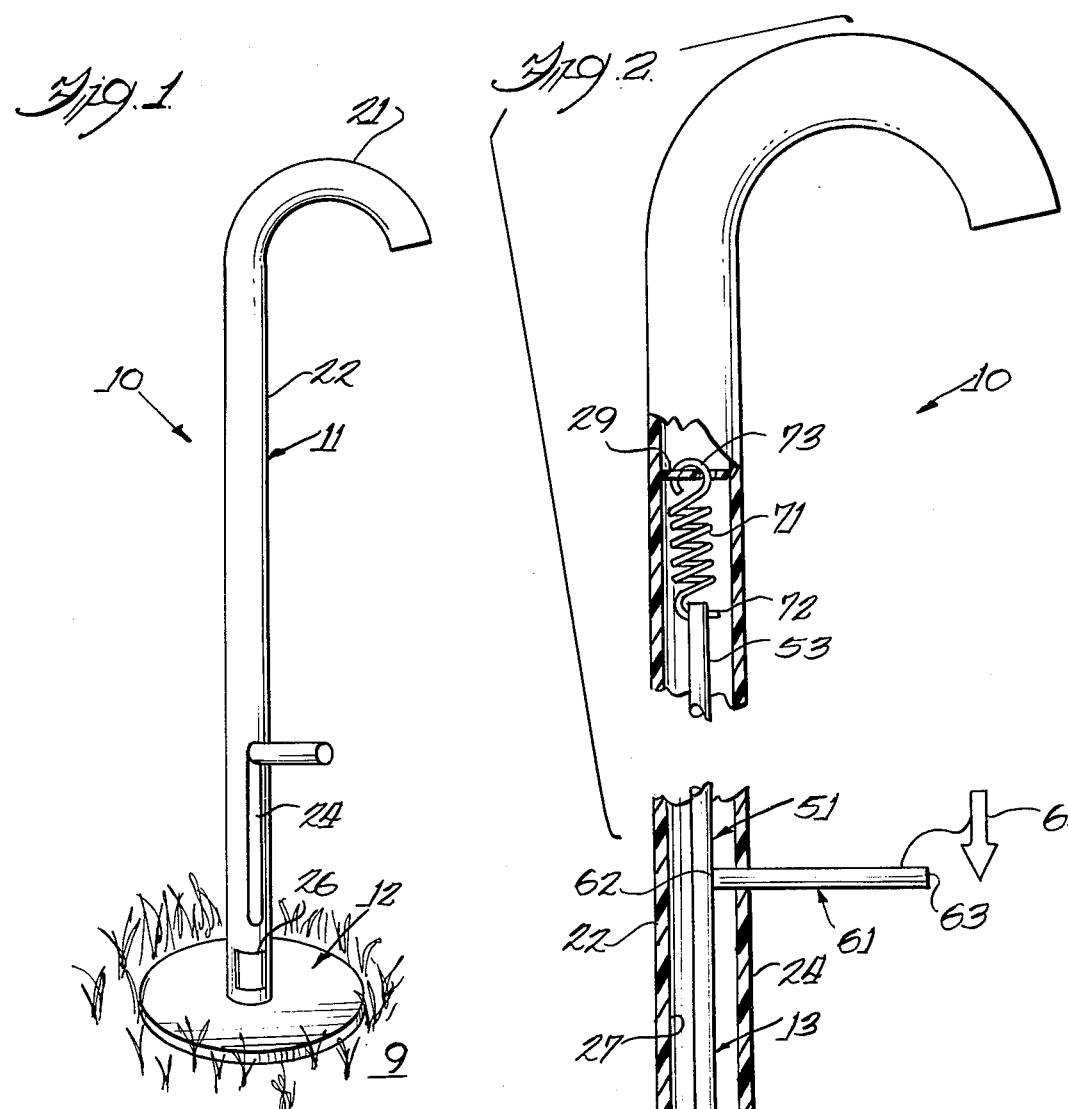
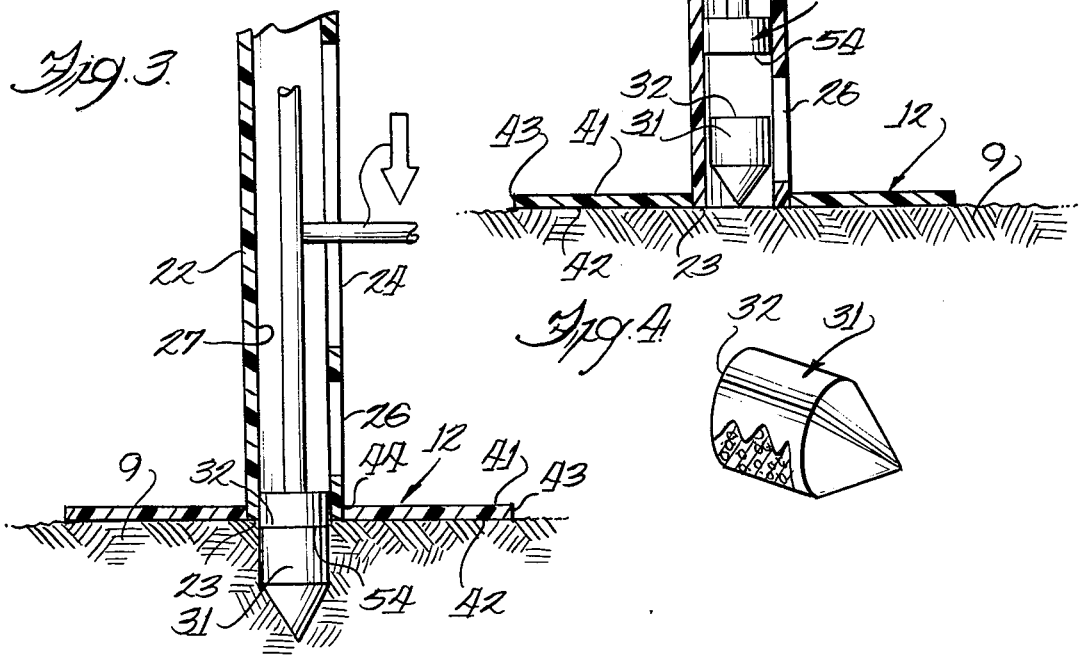

FERTILIZER APPLICATOR TOOL

BACKGROUND OF THE INVENTION

1. Field of the Invention

This invention relates generally to garden tools and more particularly to a novel and improved fertilizer applicator tool adapted to inject pellets of fertilizer into the ground to directly feed the fertilizer to the roots of trees, bushes, and the like thus permitting the roots to absorb a high percentage of the fertilizing nutrients of the pellets.

2. Description of the Prior Art

In the pursuit of landscaping, gardening, and the like many different types of plant nutrients and fertilizers are utilized with the greater part of such fertilizers being spread on top of the ground for the fertilizing of ground covering plants, such as grass and the like. Further, in the fertilizing of trees, shrubbery, and the like many individuals proceed to fertilize the same by spreading such fertilizer on top of the ground at the base of the item to be fertilized, but this is quite inefficient in that the fertilizer dissipates quickly with much of the fertilizer being absorbed by the roots of grass or other ground covering plants rather than being able to penetrate the ground to the depth required to fertilize the roots of the tree or bush for which the fertilizer is intended.

A further problem associated with attempting to fertilize the roots of trees, bushes and the like by the spreading of fertilizer above the ground is that very little of the fertilizer will actually reach the roots of the plant intended to be fertilized simply by virtue of the fact that the roots of the plant are most often well seated below the ground.

In view of this problem, prior art devices have been designed in an attempt to more closely seat the fertilizer below the ground near the roots of the plant, but such devices employ a multiplicity of components with the most common device being in the form of an elongated hollow tube having a fertilizer cartridge receiving compartment in the top thereof into which an individual inserts a water soluble pellet of fertilizer, the pole then being forced into the ground near the roots to be fed with a hose then connected to the top of the pole with the incoming water from the hose dissolving the fertilizer pellet with the solution of water and fertilizer then being discharged from the bottom of the pole into the ground near the plant roots to be fertilized. While this provides a suitable fertilizing at the time of the plant roots, such fertilizing is not of a long term effect but rather is of a rapid one-shot type arrangement requiring that such be repeated at frequent intervals throughout the growing season if proper fertilization of the plant is to be obtained.

In an attempt to overcome the disadvantages of water soluble fertilizing feeding of the plant roots, other prior art devices have been designed involving the boring of a cylindrical hole into the ground about the base of the plant to be fertilized, with solid long term feeding pellets of fertilizer being inserted into the holes, after which the dirt removed from the holes is replaced therein, this type of fertilizing only having to be performed at infrequent intervals during the growing season thus providing a distinct advantage over water soluble feeding requiring constant efforts and time by an individual to maintain a constant feeding and fertilizing schedule of the plants. However, the boring of holes into the lawn for the solid feeding process if quite time consuming and laborious in nature with such procedure normally being used only by the professional gardeners and landscapers in view of the expensive materials and tools involved to accomplish the boring of the ground to the depths required.

Prior art devices thus suffer many problems and difficulties in attempting to provide a device for proper fertilizing of trees, bushes, and other plants having roots well beneath the ground with the best method only being available to the professional landscaper and the homeowner left with a poor second best method in view of the cost of tools and the expertise in handling of the same involved with the best method as used by professional gardeners and landscapers.

SUMMARY OF THE INVENTION

The present invention recognizes the problems encountered by homeowners in attempting to properly fertilize trees, bushes, and the like having roots well below the level of the ground by providing a novel fertilizing applicator tool operable in a manner to inject solid pellets of compressed fertilizer directly into the ground below the level thereof in closer proximity to the roots of the tree to be fertilized.

Further, the present invention provides a novel tool permitting the inferquent fertilizing of deep rooted plants and trees in a manner similar to that as utilized by professional gardeners and landscapers with tools and equipment many times more expensive than the tool of the present invention.

It is a feature of the present invention to provide a fertilizer applicator tool adapted to inject pellets of solid fertilizer into the ground about the base of a tree to be fertilized in a manner placing the pellets beneath the roots of surrounding ground cover, such as grass and the like, and in closer proximity to the roots of the tree than if the fertilizer was merely dispensed on top of the ground.

It is a feature of the present invention to provide a fertilizer applicator tool which is of simple construction, has a minimum number of parts, is easy to use and efficient in operation, and may be manufactured and sold at a minimum expense within reach of the normal homeowner as a valuable tool to be used in the fertilizing of deep rooted trees and the like.

Still a further feature of the present invention provides a fertilizer applicator tool adapted to drive a pellet of fertilizer into the ground upon movement of a slidable rod in the tool in a manner to engage the pellet.

Yet still a further feature of the present invention provides an inexpensive and readily manufactured tool for injecting fertilizing pellets beneath the level of the ground in close proximity to the roots of a tree or the like to be fertilized, such pellets dissipating its nutrients at a slow rate for a continuous and constant long term feeding of the tree roots.

Other features and advantages of this invention will be apparent during the course of the following description.

BRIEF DESCRIPTION OF THE DRAWINGS

In the accompanying drawings forming a part of this specification, and in which like reference characters are employed to designate like parts throughout the same:

FIG. 1 is a perspective view of a fertilizer applicator tool constructed in accordance with the present invention and resting on the ground;

FIG. 2 is an enlarged fragmentary front elevational view, partially broken away and in partial cross-section, showing the fertilizer applicator tool of the present invention with a bullet shaped pellet of fertilizer inserted therein preparatory to driving the same into the ground;

FIG. 3 is a fragmentary front elevational cross-sectional view showing the fertilizer pellet partially driven into the ground; and FIG. 4 is a perspective view of a bullet shaped pellet of compressed fertilizer intended for use in the tool of the present invention.

DESCRIPTION OF THE PREFERRED EMBODIMENT

Referring now to the drawings in detail there is illustrated a preferred form of a fertilizer applicator tool constructed in accordance with the present invention and which is designated in its entirety by the reference numeral 10 in the general shape of a cane and is comprised of an elongated tubular member 11, a ground engaging plate 12, and a rod 13 movable within the tubular member.

The elongated tubular member 11 is in the form of an inverted J-shape having a handle portion 21 and a hollow tubular shank portion 22 open at the bottom end 23 thereof with a longitudinally extending elongated slot 24 formed in the side wall of the shaft 22 and disposed above the open end 23 and beneath the midpoint of the shaft. An opening 26 is provided in the side wall of the shaft 22 disposed immediately above the ground engaging plate 12 and is adapted for loading therethrough bullet shaped pellets 31 having a diameter slightly less than the interior diameter of the elongated chamber 27 defined in the shaft 22.

The elongated member 11 is preferably manufactured out of metal, either galvanized or chrome plated if of steel to protect the same against the effects of corrosion and rust, or it may be manufactured of anodized aluminum or the like, with it being understood that other suitable satisfactory materials may also be utilized, such as a high density plastic, hard rubber, and the like. Further, it is to be understood that the bullet shaped pellets 31 are formed of compressed fertilizing materials which may be of any desired chemical composition or combination thereof which is then compressed in the bullet shape adapted for insertion into the ground.

The ground plate 12 is formed of a circular flat sheet of material having a top surface 41, a bottom ground engaging surface 42, an outer peripheral circular edged surface 43, and an inner opening 44 of a diameter adapted to receive therethrough the open end 23 of the shaft 22 with the ground plate being secured to the shaft in any suitable manner, such as by welding, soldering, and the like, such as illustrated in FIG. 3. Alternatively, it is to be understod that the ground plate 12 may be formed integrally with the bottom open end 23 of the shaft 22 if so desired, this being as illustrated by the ground plate 12 in FIG. 2 which is identical with the ground plate of FIG. 3 except for the elimination of the unnecessary opening 44 extending therethrough.

Disposed within chamber 27 is a longitudinally elongated piston shaped rod 51 having an enlarged head portion 52 and a shaft portion 53 extending upwardly therefrom, the rod 51 disposed in the chamber for axial reciprocal movement therein toward and away from the open end 23. It is to be understood that while the rod 51 is shown as having an enlarged head portion 52 serving to guide the rod in its movements through the chamber 27, that the entire rod may be provided with a diameter just slightly less than the inner diameter of the chamber 27 in a manner guiding the rod axially therethrough. The enlarged head portion 52 is provided with a bottom surface 54 adapted to engage the top surface 32 of a pellet loaded into the bottom end portion of the chamber 27 through opening 26.

An elongated cylindrical foot pedal 61 has one end 62 connected to a side wall of the rod 51 with the opposite free end 63 projecting radially outwardly therefrom through slot 24 to be manually operated from outside of the chamber 27.

The rod 51 is maintained in a normally biased upward position by a spring 71 having one end 72 connected to the top end of the rod 51 with the opposite end 73 of the spring connected to a cross member 29 formed integrally with the shaft 22, the spring resiliently urging the rod in an upward axial direction such that after any downward movement of the rod as may be effected by applying a downward pressure on the foot pedal 61 in the direction as indicated by arrow 65 will effect the stretching of the spring 71 so that upon release of the downward pressure the spring will return the rod to the upward position in preparation for further usage.

In opertion, the tool 10 is rested on the ground plate 12 above a location on the ground 9 into which it is desired to inject a pellet 31, after which a pellet 31 is inserted through opening 26 into the bottom end of chamber 27 with the pointed end thereof oriented downwardly toward the ground. The user then stabilizes the tool through use of the handle 21 and steps downwardly on foot pedal 61 to engage bottom surface 54 of the rod 51 with the top surface 32 of the pellet, with continued downward pressure on the foot pedal driving the pellet into the ground 9 a distance below the top level of the ground, after which the user removes the foot pressure from the foot pedal with the spring 71 serving to return the rod and foot pedal to their respective upward position ready for further usage at the same location or to be transported to a different location about the base of the tree or shrub to be fertilized at which time the procedure is repeated in a rapid and positive manner.

There is thus provided a relatively inexpensive and easy to use tool enabling an individual to inject a fertilizer pellet into the ground at a position in closer proximity to the roots of a tree than if the fertilizer was merely spread on top of the ground at the base of the tree, such tool being readily utilized without any special expertise or other tools being required in a rapid and efficient manner of operation.

It is to be understood that the form of this invention herewith shown and described is to be taken as a preferred example of the same, and that this invention is not to be limited to the exact arrangement of parts shown in the accompanying drawings or described in this specification as various changes in the details of construction as to shape, size, and arrangement of parts may be resorted to without departing from the spirit of the invention, the scope of the novel concepts thereof, or the scope of the sub-joined claims.

Having thus described the invention, what is claimed is:

1. A fertilizer applicator tool intended for use with solid bullet shaped pellets of fertilizer in a manner to inject the pellets beneath the surface of the ground, comprising:

an elongated hollow tubular member open at one end and closed at the opposite end defining an elongated chamber therebetween;

a flat plate surrounding the tubular member open end extending normal to the axis of the tubular member adapted to engage the ground and support the tubular member thereon;

an elongated rod disposed axially in the chamber adapted for axial reciprocal movement therein toward and away from the open end;

a first elongated longitudinally extending slot in the tubular member side wall extending along the middle and lower portions thereof;

a manually operable foot pedal having one end connected to the rod with the opposite free end projecting radially therefrom through the first slot adapted to be engaged by an individual's foot in a manner urging the rod outwardly of the open end; and a second slot disposed in the tubular member side wall immediately above the ground engaging plate of a size and configuration to permit insertion therethrough of the bullet shaped fertilizer pellets into the chamber poriton located below the bottom end of the rod with the pointed end of the pellet oriented downwardly toward the ground whereby depressing the foot pedal will engage the rod bottom end with the pellet top end in a manner to drive the pellet into the ground.

2. The fertilizer applicator tool as set forth in claim 1 wherein the rod is continuously biased in the upward direction away from the open end of the tubular member by a spring means attached between the upper end portion of the rod and the closed end portion of the tubular member, the depressing of the rod by downward pressure on the foot pedal extending the spring with release of such foot pressure permitting the spring to return the rod to the upward position in the chamber ready for further utilization.

3. The fertilizer applicator tool as set forth in claim 2 wherein the rod includes a longitudinally extending shank portion with an enlarged diameter head portion at the bottom end thereof adapted to engage the top of the pellet, the diameter of the head portion being slightly less than the diameter of the chamber to act as a reciprocal guide for guiding the axial reciprocal movement of the rod in the chamber, and the compressed pellet of fertilizer having a diameter substantially equal to the diameter of the head portion of the rod.

4. The fertilizer applicator tool as set forth in claim 3 wherein the foot pedal is defined by an elongated cylindrical rod having one end fixedly connected to the side wall of the shaft with the opposite free end projecting radially outwardly therefrom, the diameter of the foot pedal elongated rod being less than the diameter of the axially reciprocal shank.

5. The fertilizer applicator tool as set forth in claim 4 wherein the tubular member, ground engaging plate, elongated rod, and foot pedal are manufactured of suitable metal material.

6. The fertilizer applicator tool as set forth in claim 4 wherein the ground engaging plate is formed integrally with the bottom open end of the tubular member in the form of a flat radial outwardly extending flange member.

* * * * *